United States Patent
Sadkhin

[19]

[11] Patent Number: 5,876,596
[45] Date of Patent: Mar. 2, 1999

[54] APPARATUS FOR TREATING WATER

[75] Inventor: Grigory Sadkhin, Brooklyn, N.Y.

[73] Assignee: Coleman Sudol, LLP, New York, N.Y.

[21] Appl. No.: 818,635

[22] Filed: Mar. 14, 1997

[51] Int. Cl.$^6$ .................................................. C02F 1/27
[52] U.S. Cl. ............................ 210/143; 62/124; 62/126; 62/159; 210/149; 210/181; 210/182; 210/187; 216/192; 216/197; 216/202; 216/571
[58] Field of Search ............................... 62/123, 124, 126, 62/159; 210/737, 766, 774, 748, 143, 149, 175, 177, 182, 187, 192, 198.1, 199, 202

[56] References Cited

U.S. PATENT DOCUMENTS

| | | | |
|---|---|---|---|
| 1,931,347 | 10/1933 | Gay | 62/124 |
| 3,095,295 | 6/1963 | Colton | 62/58 |
| 3,442,801 | 5/1969 | Anderson | 210/205 |
| 3,677,405 | 7/1972 | Keith, Jr. | 210/202 |
| 4,370,865 | 2/1983 | Hibino et al. | 62/124 |
| 4,411,798 | 10/1983 | Chan | 210/727 |
| 4,714,525 | 12/1987 | Spevack | 203/10 |
| 5,527,470 | 6/1996 | Suda | 210/739 |
| 5,635,059 | 6/1997 | Johnson | 210/192 |

*Primary Examiner*—Peter A. Hruskoci
*Attorney, Agent, or Firm*—R. Neil Sudol; Henry D. Coleman

[57] ABSTRACT

An apparatus for treating water to produce potable water includes a filter connected to an inlet of a heating unit in turn connected at an outlet to an input of a container with cooling components for separating out heavy water. The heavy water separator is coupled at an outlet to a tank having cooling and heating components and an ultraviolet radiation source for irradiating the water sample from the heavy water separator with ultraviolet radiation during a freezing and subsequent warming of the water sample. A storage vessel and a silver ionizer are disposed on a downstream side of the ultraviolet treatment tank. Various operations, including timing and water transfer, heating cooling and irradiating, are controlled by a programmed computer. Temperature sensors are disposed in the heating unit, the heavy water separator and the irradiation tank for monitoring temperatures of the water in the heating unit, the container and/or the tank. The programmed computer is operatively coupled to the sensors for controlling the cooling components and the heat exchange components in response to signals from the sensors.

18 Claims, 2 Drawing Sheets

APPARATUS FOR TREATING WATER

BACKGROUND OF THE INVENTION

This invention relates to a method and/or an apparatus for treating water. More particularly, this invention relates to a method and/or an apparatus for producing healthy potable water, useful in preventive therapy.

Water is, of course, a sine qua non of life on this planet. The importance of having clean, microbe-free water is indisputable. It is also known that water is healthier when the naturally occurring amounts of deuterium oxide or heavy water have been removed. People can extract heavy water manually, using a refrigeration unit. It is known that heavy water crystallizes or freezes at a higher temperature (about 38° F.) than normal water.

OBJECTS OF THE INVENTION

An object of the present invention is to provide a method and/or an apparatus for treating water.

A more specific object of the present invention is to provide a method and/or an apparatus for treating water to enhance the potability of the water.

Another object of the present invention is to provide such a method and/or an apparatus for producing healthy potable water which is useful in preventive therapy.

More particularly, it is an object of the present invention is to provide such a method and/or an apparatus for producing water useful in the treatment and prevention of diseases.

These and other objects of the present invention will be apparent from the drawings and descriptions herein.

SUMMARY OF THE INVENTION

An apparatus for treating water to produce potable water comprises, in accordance with the present invention, a first device for effectively separating heavy water (deuterium oxide) out from an incoming water sample to produce a light-weight water sample, and a second device, operatively connected to the first device, for irradiating the light-weight water sample with ultraviolet radiation.

Thus, the invention is directed in part to an apparatus which performs a deuterium-oxide extraction and destroys bacteria via ultraviolet light. It is generally contemplated that these two operations will take place in separate containers or tanks, the substantially deuterium-free water being automatically transferred from a container to a tank where the ultraviolet radiation treatment is implemented. However, it possible for the ultraviolet treatment to be effectuated in the same chamber.

Cooling components are operatively connected to the container for reducing a temperature of the incoming water sample to a predetermined temperature (e.g., between 35° F. and 37° F.) above freezing and maintaining the incoming water sample at that predetermined temperature for a predetermined period. This predetermined period obviously depends not only on the amount of water being subjected to the physical separation procedure but also depends on the configuration of the container. Different container configurations will subject the incoming water sample to different surface areas. Generally, the greater the surface area in contact with the water sample, the less time required for separating out the heavy water.

Preferably, the second device includes components for irradiating the light-weight water sample with ultraviolet radiation during at least a portion of a freezing and subsequent warming of the light-weight water sample. More specifically, the second device includes a tank for holding the light-weight water sample, heat exchange components operatively connected to the tank for freezing and subsequently warming the light-weight water sample, and an ultraviolet radiation source disposed sufficiently proximate to the tank for exposing the light-weight water sample in the tank to the ultraviolet radiation.

The deuterium-separation container is coupled to the irradiation tank (via a conduit) for transferring the light-weight water sample from the container to the tank after the predetermined period and prior to the freezing and subsequent warming of the light-weight water sample.

Preferably, the water treatment apparatus includes additional devices, other than the deuterium-separation device and the irradiation device. The additional devices include a heating unit and a filter disposed upstream of the container. The heating unit elevates the temperature of the incoming water sample prior to feeding thereof to the deuterium-separation container and is connected to an input of the container. The filter serves to remove particles from the incoming water sample. Preferably, the filter is located upstream of the heating unit, i.e., at an input thereof.

An optional device of the water treatment apparatus is a silver ionizer which adds controlled amounts of silver ions to the treated water prior to delivery to a user. The ionizer is located at an outlet of the irradiation tank and is connected thereto for adding silver ions to the irradiated light-weight water sample.

A storage vessel may be provided at an outlet of the irradiation tank. Conduits are provided at an outlet of the storage vessel and an outlet of the silver ionizer for delivering water from the storage vessel and the ionizer to a user. The ionizer is preferably connected to the tank via the storage vessel.

In a particular embodiment of the invention, the various operations are controlled by a programmed computer. The computer is connected to the operating components, including the cooling and heating components, and to a plurality of flow-control valves which are disposed respectively between the heating unit and the container, between the container and the tank, between the tank and the storage vessel, and between the storage vessel and the chamber. The computer thus determines the successive residence times of a water samples in the heating unit, the deuterium-separation container, the irradiation tank, the storage vessel and the ionizer, as well as the heating and cooling rates and the high and low temperatures. To that end, temperature sensors may be disposed respectively in the heating unit, the container and/or the tank for monitoring temperatures of the water in the heating unit, the container and/or the tank. The programmed computer is operatively coupled to the sensors for controlling the cooling components and the heat exchange components in response to signals from the sensors.

A method for treating water to produce potable water comprises, in accordance with the present invention, effectively separating heavy water out from an incoming water sample to produce a light-weight water sample and irradiating the light-weight water sample with ultraviolet radiation.

The separating out of the heavy water more specifically includes reducing a temperature of the incoming water sample to a predetermined temperature (between approximately 35° F. and approximately 37° F.) above freezing and maintaining the incoming water sample at the predetermined temperature for a predetermined period.

In accordance with another feature of the present invention, the method further comprises freezing the light weight-water sample and subsequently heating the frozen light-weight water sample. The light-weight water sample is subjected to the ultraviolet radiation during at least a portion of the freezing and subsequent warming cycle.

The separating out of the heavy water includes cooling of the incoming water sample in a first container to the predetermined temperature, while the freezing, subsequent heating and irradiating take place in a second container downstream of the first container. The light-weight water sample is transferred from the first container to the second container after the predetermined period and prior to the freezing and subsequent warming of the light-weight water sample.

Other steps in a method in accordance with the present invention include heating the incoming water sample prior to the separating out of the heavy water, adding silver ions to the water sample after the irradiating thereof, and operating a programmed computer to control flow of the incoming water sample prior to and after the separating out of heavy water. The programmed computer is also operated to control cooling in the first container and freezing, heating and irradiating in the second container. This computer control of cooling, freezing, heating and irradiating operations may be executed in response to temperatures which are automatically sensed in a temperature monitoring step.

An apparatus and method in accordance with the present invention provide potable, snow-defrosted or structuralized water which is particularly healthy for the elimination bacteria and the removal of naturally occurring heavy water. The water treated by an apparatus and associated method in accordance with the invention is useful in disease prevention, and even in the healing of illnesses, both in human beings and livestock. The desired water is produced in a single cycle of operation of the apparatus and is produced automatically, under microprocessor or computer control.

DESCRIPTION OF THE PREFERRED EMBODIMENTS

Figure 1:
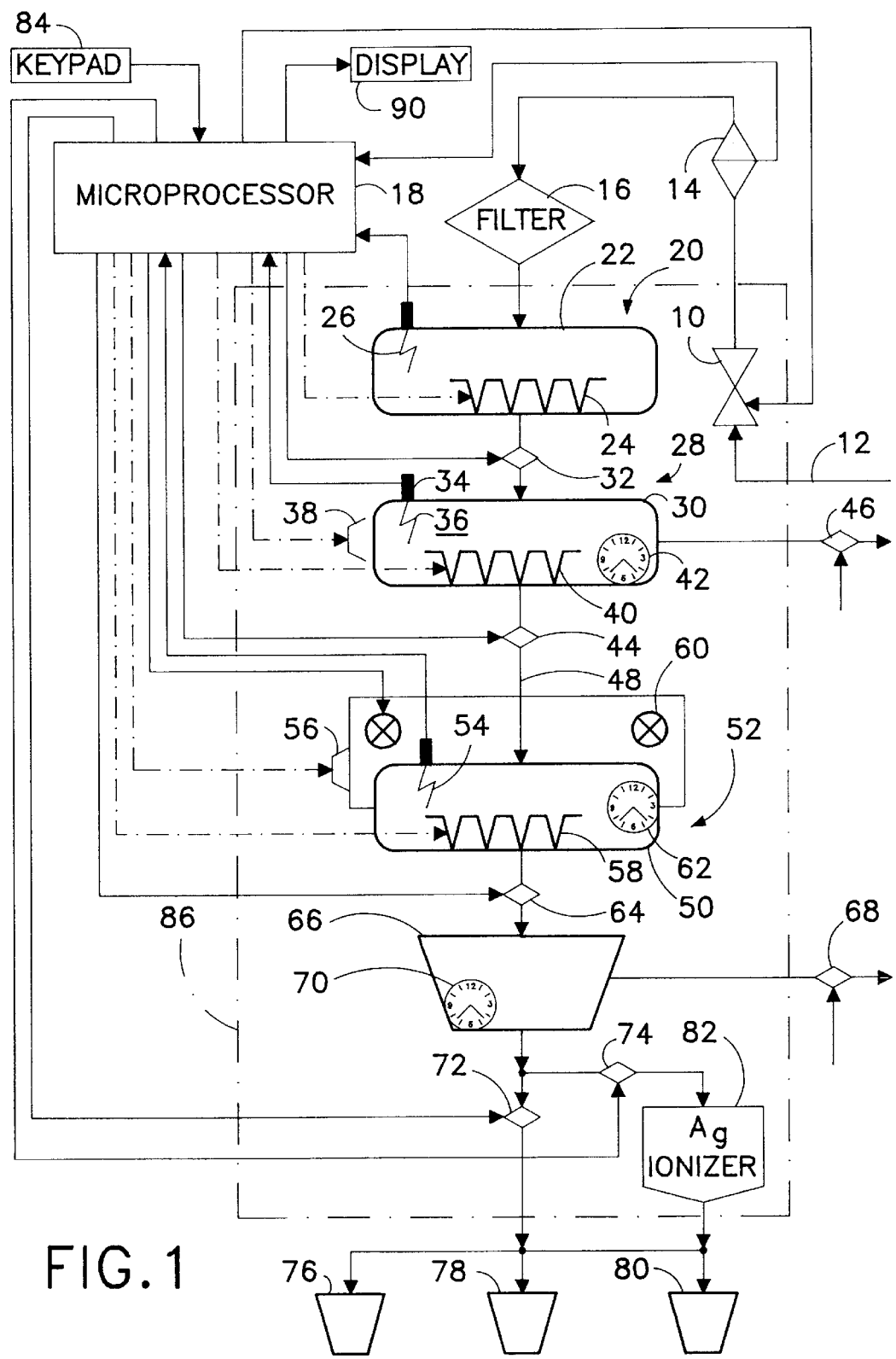
FIG. 1 is a block diagram of a water treatment apparatus in accordance with the present invention.

As illustrated in FIG. 1, a water treatment apparatus includes a solenoid valve 10 connected to a pipe 12 extending from a water main or other tap water source (not illustrated). Solenoid valve 10 is connected at an outlet to a water meter 14 in turn linked on a downstream side to a filter 16. Valve 10 is opened by a programmed microprocessor or computer 18 for a time depending on the water flow rate as measured by meter 14. The total amount of water is predetermined in accordance with system capacity. Generally, the system or apparatus of FIG. 1 produces treated batches of water, one batch per cycle of operation. Valve 10 is locked or closed when a necessary and sufficient amount of water has been supplied.

Filter 16 is made of mesh, carbon granules, and wadding and/or other conventional filter materials for cleaning dust and other particulate impurities from an incoming water sample or batch. Filter 16 is connected on a downstream side to an inlet of a heating unit 20. Heating unit 20 includes a vessel 22 provided with a heating element 24 such as a submersible electrical coil and further provided with a temperature sensor 26 such as a thermocouple. Heating element 24 is energized under the control of microprocessor 18 in order to maintain the water sample at a "close-to-saturation" condition, i.e., at a temperature of approximately 94°–96° C. (201°–205° F.), under atmospheric pressure. Heating unit 20 may also include a level detector (not illustrated) which is operatively connected to valve 10, for example, via microprocessor 18, for terminating the flow of water into vessel 22 upon the attainment by the incoming water of a predetermined level in vessel 22.

Heating unit 20 is coupled at an outlet to a deuterium separator 28. Deuterium separator includes a container 30 which is connected at an inlet to vessel 22 of heating unit 20 via a solenoid valve 32. Valve 32 is opened by microprocessor 18 to transfer a heated water sample by gravity from vessel 22 to container 30. Deuterium separator 28 additionally includes a temperature sensor or meter 34 such as a thermocouple operatively linked to microprocessor 18 for supplying the microprocessor with signals which are indicative of the temperature in a chamber 36 enclosed or defined by container 30. Deuterium separator 28 also includes a cooling element 38 and a submersible electrical heating element or coil 40. Cooling element 38 and heating coil 40 are activated by a dedicated timer 42 or by microprocessor 18 partially in response to signals from temperature sensor 34. Cooling element 38 may take the form of a submersible girdled coil with a circulating coolant.

Deuterium separator 28 functions to remove heavy water (deuterium oxide) from each water sample by cooling the water sample to a temperature between 35° F. and 37° F. and maintaining the water sample at that predetermined temperature for a predetermined period. Because heavy water freezes at a temperature of approximately 38° F., the heavy water will migrate and adhere to the walls of container 30 in a frozen state, thereby physically separating the heavy water from the lighter weight "normal" water molecules. Cooling element 38 serves to reduce the temperature of the water sample transferred from heating unit 20 via solenoid valve 32. The period clocked by timer 42 or microprocessor 18 depends not only on the amount of water being subjected to the physical separation procedure but also depends on the configuration of container 30. Different configurations of container 30 will subject the incoming water sample to different surface areas. Generally, the greater the surface area in contact with the water sample, the less time required for separating out the heavy water.

After the requisite period has passed, a solenoid valve 44 at an outlet of container 30 is opened by timer 42 or microprocessor 18 to drain the light-weight water sample from the deuterium separator 28. While the water is draining, chamber 36 is maintained at the predetermined deuterium separation temperature (35°–37° F.), thereby ensuring that the heavy water remains in container 30. After all the light-weight water has been drained from container 30, timer 42 or microprocessor 18 closes valve 44, deactivates cooling element 38 and energizes heating coil 40 to increase the temperature of chamber 36 to approximately 50° C. (122° F.), thereby warming the heavy water and returning it to a liquid form. Timer 42 or microprocessor 18 then opens another solenoid valve 46 which allows the heavy water to flow from container 30. Deuterium separator 28 is now ready for the next operating cycle.

Valve 44, at an outlet of deuterium separation container 30, is connected via a conduit 48 to an inlet of a tank 50 which forms a part of an irradiation unit 52. Other parts of irradiation unit 52 include a temperature sensor or monitor 54, a cooling element 56, a heating coil 58 and ultraviolet radiation sources or generators 60, which are all operatively connected to microprocessor 18. Under the control of microprocessor 18 or a dedicated timer 62, irradiation unit 52 irradiates the light-weight water sample from separator 28 with ultraviolet radiation during at least a portion of a freezing and subsequent warming of the light-weight water sample.

After valve 44 has been open for a sufficiently long interval to permit the essentially deuterium free water from separator 28 to flow into tank 50, timer 62 or microprocessor 18 activates cooling element 56 to reduce the temperature of the water sample to the freezing point (32° F.). After a time at the freezing temperature long enough to freeze the entire water sample, timer 62 or microprocessor 18 deactivates cooling element 56 and energizes heating coil 58 to increase the temperature of the water sample. During at least a portion of this cooling and heating cycle and preferably during the entire process, timer 62 or microprocessor 18 transmits a signal to ultraviolet radiation sources 60 for induce those sources to emit ultraviolet radiation so that the radiation falls on the water sample in tank 50. With sources 60 located outside tank 50, that unit may be provided with a wall which is transparent to ultraviolet radiation.

After the cooling and warming cycle in tank 50 has terminated, timer 62 or microprocessor 18 opens a valve 64 at an outlet of tank 50, thereby permitting the irradiated water sample to pass into a storage vessel 66. The water is maintained no longer than about five hours in vessel 66. Any water remaining at the end of that time is drained to a sewage system via a valve 68. Valve 68 is alternately opened and closed by a dedicated timer 70 or by microprocessor 18. Valve 10 is opened to prepare another water sample at the time that vessel 66 is emptied. Vessel 66 may be provided with a level sensor (not illustrated) for monitoring the level of water and informing microprocessor 18 when that level has fallen to a predetermined minimum. At that time, microprocessor 18 opens valve 10 and initiates another water treatment cycle.

Two valves 72 and 74 at an outlet of storage vessel 66 are controlled by microprocessor 18 to deliver treated water from storage vessel 66 either directly to a hot water outlet 76, a cold water outlet 78 or a room-temperature outlet 80 or indirectly to outlets 76, 78 and 80 via an electrolytic ionization chamber 82 for adding silver ions to the water. The direction of water flow at the outlet of storage vessel 66 is determined by microprocessor 18 in response to a request entered into the microprocessor by a user via a keypad 84. Outlets 76 and 78 may be provided with internal heating and cooling elements (not illustrated) for modifying the temperature of water flowing therethrough.

Various components of the water treatment system of FIG. 1 are disposed in an insulated enclosure 86.

The water treatment apparatus or system of FIG. 1 utilizes a single operating cycle under conditions which closely imitate natural processes to produce potable water which is useful in disease prevention and treatment. Water is filtered by filter 16, degassed in heating unit 20, separator 28 and irradiation unit 52, relieved of deuterium oxide in separator 28, frozen and thawed ("snow-defrosted") in an ultraviolet radiation field in irradiation unit 52, optionally enriched with silver ions in ionization chamber or ionizer 82 and heated or cooled, if required, at outlets 76 and 78. The automatic system with microprocessor 18 is capable of supporting a normal operating mode with a minimal number of aberrations at all stages of the manufacture of the snow-defrosted or structuralized water.

Figure 2:
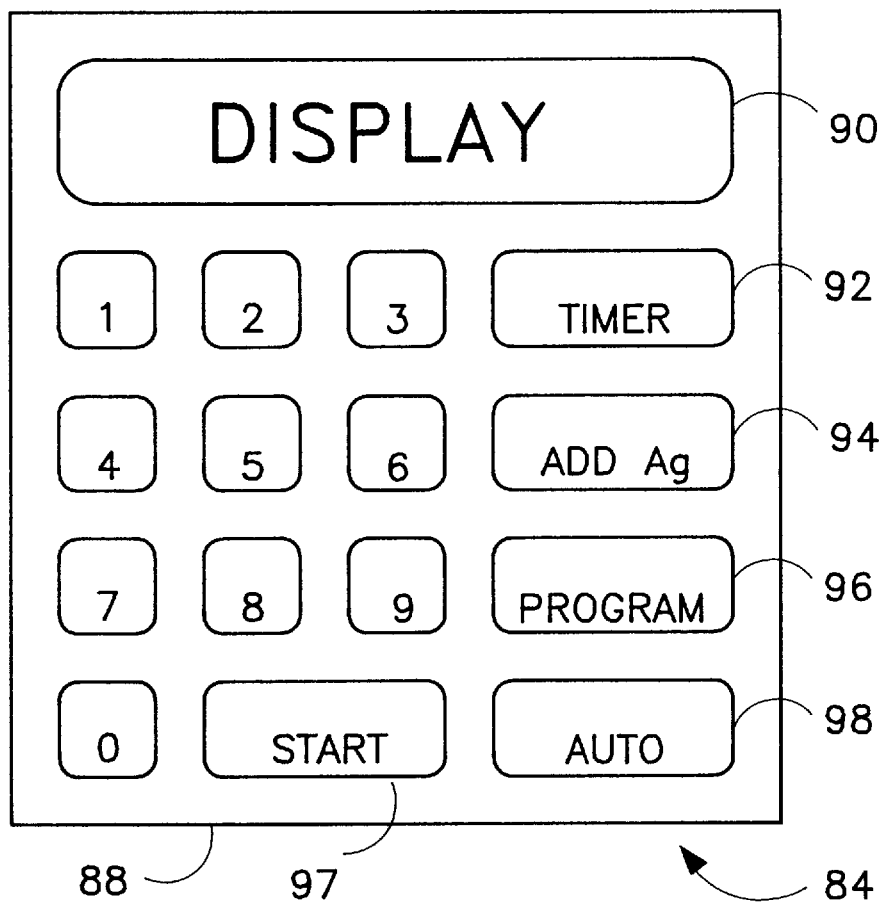
FIG. 2 is a front elevational view of a combined keypad and display utilizable in the apparatus of FIG. 1.

As illustrated in FIG. 2, the water treatment apparatus or system of FIG. 1 may be provided with a single unit 88 housing both keypad 84 and a display 90. Keypad 84 includes a first dedicated button or pushpad 92 for initiating a time setting operation, a second dedicated button or pushpad 94 for instructing the addition of silver ions, a third dedicated button or pushpad 96 for selecting a programming sequence, as well as dedicated start and automatic operation push pads 97 and 98.

It is to be understood that the term "light-weight water sample" is used herein to designate quantity of water which has been treated to remove a measurable amount (0.15%) of heavy water from an incoming water sample. However, the change in water weight is not generally perceptible by the senses or common weighing devices. In a strict sense, the treated water at an outlet of the water treatment system is also lighter because of the removal of particles by the filter disposed upstream of the deuterium separation container.

Although the invention has been described in terms of particular embodiments and applications, one of ordinary skill in the art, in light of this teaching, can generate additional embodiments and modifications without departing from the spirit of or exceeding the scope of the claimed invention. For example, the functions of heating unit 20 and separator 28 may be combined in a single unit, with a single vessel or container. Also, the heating elements 24, 40, 58 may be convection elements disposed externally to vessel 22, container 30 and tank 50. The gravity induced fluid flow may be supplemented by pump action. Additional measuring instruments such as tensometers and dosimeters may be provided.

Accordingly, it is to be understood that the drawings and descriptions herein are proffered by way of example to facilitate comprehension of the invention and should not be construed to limit the scope thereof.

What is claimed is:

1. An apparatus for treating water to produce potable water, comprising:
   a first device for effectively separating heavy water out from an incoming water sample to produce a light-weight water sample; and
   a second device, operatively connected to said first device, for irradiating the light-weight water sample with ultraviolet radiation, said second device including:
   a tank for holding said light-weight water sample;
   heat exchange components operatively connected to said tank for freezing and subsequently warming said light-weight water sample; and
   an ultraviolet radiation source disposed sufficiently proximate to said tank for exposing said light-weight water sample in said tank to said ultraviolet radiation during at least a portion of a freezing and subsequent warming of said light-weight water sample.

2. The apparatus defined in claim 1 wherein said first device includes a container for holding said incoming water sample and cooling components operatively connected to said container for reducing a temperature of said incoming water sample to a predetermined temperature above freezing and maintaining said incoming water sample at said predetermined temperature for a predetermined period.

3. The apparatus defined to claim 2 wherein
   said container is coupled to said tank for transferring the light-weight water sample from said container to said tank after said predetermined period and prior to the freezing and subsequent warming of said light-weight sample.

4. The apparatus defined in claim 3, further comprising a heating unit disposed upstream of said container for heating said incoming water sample prior to feeding thereof to said container, said heating unit being connected to an input of said container, also comprising a filter connected to an input of said heating unit.

5. The apparatus defined in claim 4, further comprising ionization means operatively connected to said tank for adding silver ions to the irradiated light-weight water sample.

6. The apparatus defined in claim 5, further comprising a storage vessel at an outlet of said tank and means at an outlet of said storage vessel and an outlet of said ionization means for delivering water from said storage vessel and said ionization means to a user.

7. The apparatus defined in claim 6 wherein said ionization means includes a chamber connected to an outlet of said tank.

8. The apparatus defined in claim 7 wherein said chamber is connected to said tank via said storage vessel, further comprising a plurality of flow-control valves disposed respectively between said heating unit and said container, between said container and said tank, between said tank and said storage vessel, and between said storage vessel and said chamber, also comprising a programmed computer operatively coupled to said flow-control valves for operating said valves.

9. The apparatus defined in claim 8 wherein said programmed computer is also operatively connected to said cooling components and said heat exchange components for controlling the operation thereof.

10. The apparatus defined in claim 9, further comprising temperature sensors disposed respectively in said container and said tank for monitoring temperatures of the water in said container and said tank, said programmed computer being operatively coupled to said sensors for controlling said cooling components and said heat exchange components in response to signals from said sensors.

11. The apparatus defined in claim 3, further comprising temperature sensors disposed respectively in said container and said tank for monitoring temperatures of the water in said container and said tank, also comprising a programmed computer operatively coupled said sensors, said cooling components and said heat exchange components for controlling the operation said cooling components and said heat exchange components in response to input from said sensors.

12. The apparatus defined in claim 3 wherein said container is coupled to said tank via a conduit provided with a valve.

13. The apparatus defined in claim 1, further comprising a heating unit disposed upstream of said first device for heating said incoming water sample prior to a feeding thereof to said first device, said heating unit being connected to an input of said first device, also comprising a filter connected to an input of said heating unit.

14. The apparatus defined in claim 1, further comprising ionization means operatively connected to said second device for adding silver ions to the irradiated light-weight water sample.

15. The apparatus defined in claim 14, further comprising a storage vessel at an outlet of said second device and means at an outlet of said storage vessel and an outlet of said ionization means for delivering water from said storage vessel and said ionization means to a user.

16. The apparatus defined in claim 1, further comprising a plurality of flow-control valves disposed respectively upstream of said first device, between said first device and said second device and downstream of said second device, also comprising a programmed computer operatively coupled to said flow-control valves for operating said valves.

17. The apparatus defined in claim 1 wherein a programmed computer is operatively connected to said first device and said second device for controlling cooling and heating functions therein.

18. The apparatus defined in claim 1, further comprising temperature sensors respectively coupled to said first device and said second device for monitoring temperatures of the water in said first device and said second device, said programmed computer being operatively coupled to said sensors for controlling cooling and heating functions in said first device and said second device in response to signals from said sensors.

* * * * *